United States Patent
Contreras

(10) Patent No.: US 12,378,463 B2
(45) Date of Patent: Aug. 5, 2025

(54) WATER-BASED RESIN WITH ELASTICITY FOR APPLICATIONS IN CEMENTING AND SUBTERRANEAN STRUCTURES

(71) Applicant: Saudi Arabian Oil Company, Dhahran (SA)

(72) Inventor: Elizabeth Contreras, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 9 days.

(21) Appl. No.: 18/468,163

(22) Filed: Sep. 15, 2023

(65) Prior Publication Data
US 2024/0093081 A1 Mar. 21, 2024

Related U.S. Application Data

(62) Division of application No. 16/930,027, filed on Jul. 15, 2020, now Pat. No. 11,795,367.

(51) Int. Cl.
C09K 8/512 (2006.01)
C04B 24/26 (2006.01)
C04B 26/06 (2006.01)

(52) U.S. Cl.
CPC .......... *C09K 8/512* (2013.01); *C04B 24/2664* (2013.01); *C04B 26/06* (2013.01)

(58) Field of Classification Search
CPC ....... C09K 8/512; C04B 26/045; C04B 26/06; C04B 24/2664
See application file for complete search history.

(56) References Cited

U.S. PATENT DOCUMENTS 4,425,241 A 1/1984 Swanson
9,932,512 B1 4/2018 Hilfiger et al.
(Continued)

OTHER PUBLICATIONS

Ayala et al., "Synthesis, Characterization, and Properties of New Sequenced Poly(ether amide)s Based on 2-(4-Aminophenyl)-5-aminobenzimidazole and 2-(3-Aminophenyl)-5-aminobenzimidazole," Scheme 1 of Journal of Polymer Science: Part A: Polymer Chemistry, 2006, 44:1414-1423, 10 pages.
(Continued)

*Primary Examiner* — Aiqun Li
(74) *Attorney, Agent, or Firm* — Fish & Richardson P.C.

(57) ABSTRACT

This disclosure relates to compositions including a poly-alkene maleic anhydride copolymer, a PEG, and a cross-linker selected from an ethyleneamine, a benzenetricarboxylic acid, a benzimidazole, and combinations thereof. The poly-alkene maleic anhydride copolymer includes repeat units I and II:

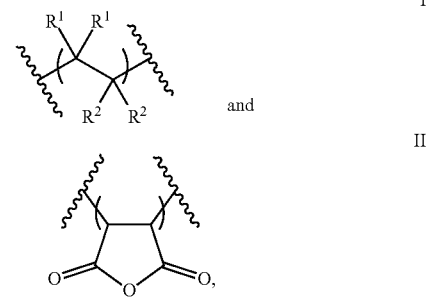

where $R^1$, $R^{1'}$, $R^2$, and $R^{2'}$ are each independently selected from —H and —($C_1$-$C_5$)alkyl. The disclosure also
(Continued)

provides methods of treating a subterranean formation or cement construction using the compositions.

21 Claims, 4 Drawing Sheets

(56) References Cited

U.S. PATENT DOCUMENTS

| | | |
|---|---|---|
| 10,005,930 B2 | 6/2018 | Reddy |
| 10,351,752 B2 | 7/2019 | Reddy et al. |
| 2017/0073569 A1 | 3/2017 | Reddy |

OTHER PUBLICATIONS

Mezger, "Applied Rheology," ISBN 3950401601, Chapter 4, pp. 22-25, Chapter 6, pp. 30-31, pp. 42-46, Chapter 11, pp. 75-77, Chapter 12, pp. 81-83, Chapter 14, pp. 90-100, 2018, 18 pages.

Oxy.com [online], "Calcium Chloride—A guide to Physical Properties," Aug. 17, 2012, retrieved on Jan. 26, 2024, retrieved from <https://www.oxy.com/siteassets/documents/chemicals/products/other-essentials/173-01791.pdf>, 12 pages.

PCT International Search Report and Written Opinion in International Appln. No. PCT/US2021/041752, dated Nov. 10, 2021, 14 pages.

Shang et al., "Gel-tape-casting of aluminum nitride ceramics," Journal of Advanced Ceramics, Mar. 2017, 6(1):67-72, 6 pages.

sigmaaldrich.com [online], "Benzimidazoles," Available on or before Aug. 22, 2009, via Internet Archive: Wayback Machine URL <https://web.archive.org/web/20090901000000*/https://www.sigmaaldrich.com/chemistry/chemistry-products.html?TablePage=16266009>, retrieved on Jun. 2, 2020, retrieved from URL <https://www.sigmaaldrich.com/chemistry/chemistry-products.html?TablePage=16266009>, 8 pages.

Storm et al., "Nonlinear elasticity in biological gels," Nature, May 12, 2005, 435:191-94, 4 pages.

WATER-BASED RESIN WITH ELASTICITY FOR APPLICATIONS IN CEMENTING AND SUBTERRANEAN STRUCTURES

CROSS-REFERENCE TO RELATED APPLICATIONS

This application is a divisional of and claims the benefit of priority to U.S. patent application Ser. No. 16/930,027, filed on Jul. 15, 2020, the contents of which are hereby incorporated by reference.

TECHNICAL FIELD

This document relates to methods and compositions used in treating subterranean formations and structures, such as cement sheaths.

BACKGROUND

In constructing oil and gas wells, cementing is the most important component. The purpose of cement is to give the well structural support and stability for the life of the well. In cementing, when constructing an oil and gas well, a number of casings are telescopically placed downhole. Surface casing, intermediate and production casings are all cemented in place for the safe production of oil and gas. During production, the cement sheath isolates the well entirely from formation fluids. These formation fluids originate from different layers underground traversed while drilling, such as water tables, gas zones, and rock formations, like halite, carbonate, quartz, and metamorphic rocks. Cement works to isolate these zones from each other, i.e., zonal isolation. Once a well reaches the production zone, the cement must maintain optimal integrity for the entire life of the well. But many scenarios can cause the cement to fracture and fail. Cement is strong, but it is also brittle, leading to microfractures and micro-annuli to propagate in the cement sheath.

When the cement fails, a resin is needed to seal these fractures and to recover the well. Instead of losing the well or having to drill a different well, zonal isolation is recovered using a sealant resin to block all flow paths to the surface; and in so doing, recovering the well. Compositions to seal off undesirable fluid paths such as gas flow channels, behind casings and fractured cement sheaths are typically based on non-aqueous epoxy monomers mixed with amines, furan resins, and polyester resins. When there is an unwanted gas or liquid flow through flow channels within a cement sheath behind a casing or between the casings, or via a microannulular flow channel between cement sheath and a metal casing, or via a microannulular flow channel between cement sheath and the subterranean formation, resin based gel compositions in contact with the set cement may not demonstrate the desired sealing. Thus, there is a need for resins that can be used to seal off undesirable fluid paths.

SUMMARY

Provided in this disclosure is a composition including a poly-alkene maleic anhydride copolymer, a polyethylene glycol (PEG), and a crosslinker selected from an ethyleneamine, a benzenetricarboxylic acid, a benzimidazole, and combinations thereof. The poly-alkene maleic anhydride copolymer includes repeat units of formulae I and II (referred to herein as "repeat unit I" and "repeat unit II"):

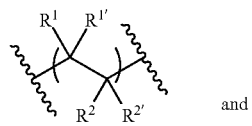

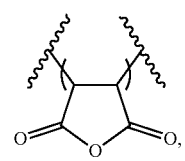

where $R^1$, $R^{1'}$, $R^2$, and $R^{2'}$ are each independently selected from —H and —$(C_1\text{-}C_5)$alkyl.

In some embodiments, $R^1$, $R^{1'}$, $R^2$, and $R^{2'}$ are each independently selected from —H and —$CH_3$. In some embodiments, one of $R^1$ and $R^{1'}$ is H and the other is —$CH_3$. In some embodiments, one of $R^2$ and $R^{2'}$ is H and the other is —$CH_3$. In some embodiments, one of $R^1$ and $R^{1'}$ is H and the other is —$CH_3$; and one of $R^2$ and $R^{2'}$ is H and the other is —$CH_3$. In some embodiments, $R^1$ and $R^{1'}$ are each H and $R^2$ and $R^{2'}$ are each independently selected from —H and —$CH_3$. In some embodiments, $R^1$ and $R^{1'}$ are each H and $R^2$ and $R^{2'}$ are each —$CH_3$.

In some embodiments, repeat unit I is selected from:

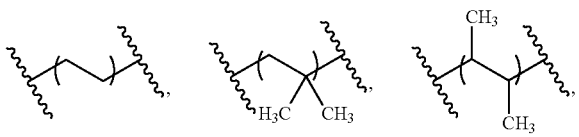

and combinations thereof. In some embodiments, repeat unit I has the structure:

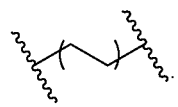

In some embodiments, repeat unit I has the structure:

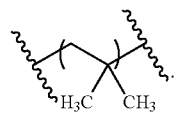

In some embodiments, repeat unit I has the structure:

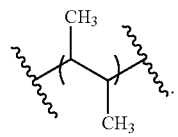

In some embodiments, repeat units I and II alternate in the maleic anhydride copolymer.

In some embodiments, the composition comprises a polyethylene glycol. In some embodiments of the composition, the polyethylene glycol has a molecular weight of about 5000 kDa to about 50,000 kDa. In some embodiments, the polyethylene glycol has a molecular weight of about 20,000 kDa.

In some embodiments, the composition comprises about 20 wt % to about 40 wt % of the poly-alkene maleic anhydride copolymer and PEG. In some embodiments, the composition comprises about 30 wt % of the poly-alkene maleic anhydride copolymer and PEG. In some embodiments, the composition comprises about 20 wt % of the poly-alkene maleic anhydride copolymer and about 10 wt % PEG. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments of the composition, the crosslinker comprises an ethyleneamine selected from ethylenediamine (EDA), diethylenetriamine (DETA), aminoethylpiperazine (AEP), triethylenetetraamine (linear-TETA), tris(2-aminoethyl)amine (branched-TETA), N,N'-bis-(2-aminoethyl)piperazine (bis-AEP), N-[(2-aminoethyl)2-aminoethyl]piperazine), piperazinoethylethylenediamine (PEEDA), tetraethylenepentamine (TEPA), and mixtures thereof. In some embodiments, the ethyleneamine is TEPA.

In some embodiments of the composition, the crosslinker comprises a benzenetricarboxylic acid selected from 1,2,3-benzenetricarboxylic acid (hemimellitic acid), 1,2,4-benzenetricarboxylic acid (trimellitic acid), 1,3,5-benzenetricarboxylic acid (trimesic acid), and mixtures thereof. In some embodiments, the benzenetricarboxylic acid is trimesic acid.

In some embodiments of the composition, the crosslinker comprises a benzimidazole that is a substituted phenylbenzimidazole. In some embodiments, the phenylbenzimidazole is substituted with one or more of —OH, —OR, —NH$_2$, —NHR, —NR$_2$, —NHCOR, —SH, —SR, —SeR, —Cl, —Br, —I, —F, —CN and —CO$_2$R, and combinations thereof, wherein R is alkyl. In some embodiments, the benzimidazole is 5-amino-2-(4-aminophenyl)benzimidazole (APBZ).

In some embodiments of the composition, the crosslinker comprises TEPA, trimesic acid, and APBZ.

In some embodiments, the composition comprises a pH adjuster. In some embodiments, the pH adjuster is sodium hydroxide (NaOH). In some embodiments, the pH of the composition is between about 12 to about 15.

In some embodiments, the composition comprises an aqueous carrier.

In some embodiments, the composition has a viscosity of about 2,000 mPa·s to about 10,000 mPa·s at 22° C. In some embodiments, the composition has a density greater than about 1.10 g/cm$^3$ and an elasticity of greater than about 2000 N/m.

Also provided in the present disclosure is a composition comprising: about 20 wt % to about 30 wt % of a poly-alkene maleic anhydride copolymer comprising repeat units I and II; about 5 wt % to about 15 wt % of a polyethylene glycol (PEG); and a crosslinker selected from an ethyleneamine, a benzenetricarboxylic acid, a benzimidazole, and combinations thereof, where the pH of the composition is between about 12 to about 15. In some embodiments, repeat units I and II are:

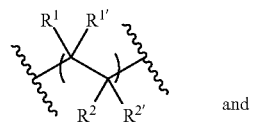

and

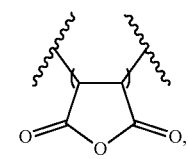

where repeat unit I is selected from:

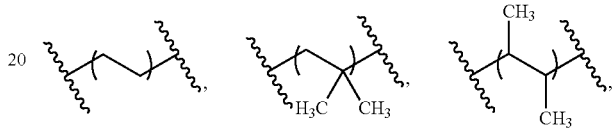

and combinations thereof. In some embodiments, the crosslinker comprises TEPA, trimesic acid, and APBZ. In some embodiments, the composition has a density of greater than about 1.10 g/cm$^3$ and an elasticity of greater than about 2000 N/m.

The present disclosure also provides a method of treating a subterranean formation or cement construction, comprising providing to the subterranean formation or cement construction a composition comprising a poly-alkene maleic anhydride copolymer, a polyethylene glycol, and a crosslinker selected from an ethyleneamine, a benzenetricarboxylic acid, a benzimidazole, and combinations thereof. The poly-alkene maleic anhydride copolymer includes repeat units I and II:

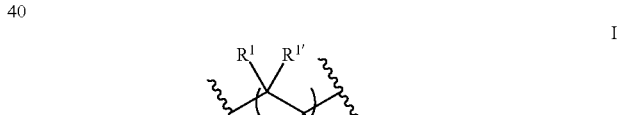

and

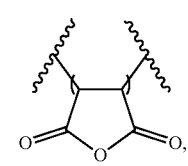

where R$^1$, R$^{1'}$, R$^2$, and R$^{2'}$ are each independently selected from —H and —(C$_1$-C$_5$)alkyl. The composition further includes a polyethylene glycol (PEG). The method includes crosslinking the composition to form a sealant.

In some embodiments of the method, forming the sealant prevents or retards undesired loss or flow of wellbore fluid into the formation or construction; or the flow of formation fluids into the formation or construction.

DETAILED DESCRIPTION

Figure 1:
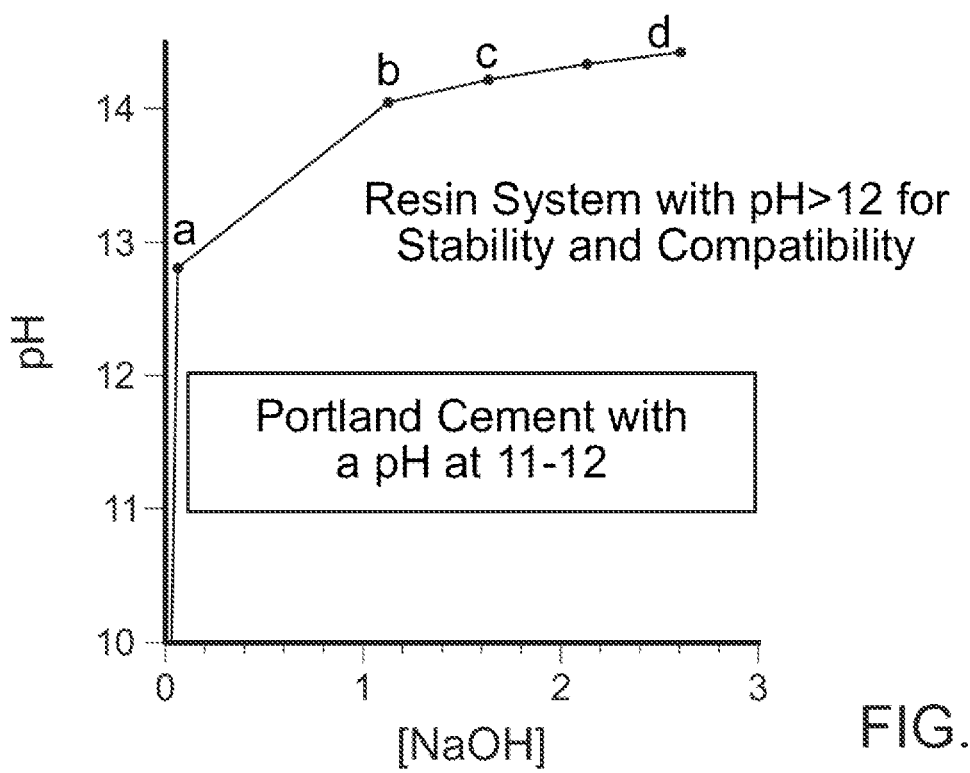
FIG. 1 is a graph showing the results of changing the pH of the composition System C as a function of molar concentration of sodium hydroxide (NaOH).

The present disclosure provides a resin composition for sealing microfractures and annuli that develop in broken cement sheaths, in order to prevent unwanted flow and return wells to a desired safe and profitable state. The compositions described in this disclosure are designed for deepest possible penetration into microfractures and annuli to provide the best seal against unwanted fluid flow. The compositions of the present disclosure contain a resin comprised of a poly-alkene maleic anhydride copolymer with repeat units I and II, a polyethylene glycol (PEG), and a crosslinker that includes an ethyleneamine, a benzenetricarboxylic acid, a benzimidazole, and combinations thereof. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer. The compositions of the present disclosure have increased heat resistance, increased elasticity (elasticity and shear modulus), and increased density as compared to other resin compositions that do not contain the composition comprising the poly-alkene maleic anhydride copolymer, PEG, and crosslinker of the present disclosure. Embodiments of the compositions, as well as the methods of making and using the compositions for treating a subterranean formation or cement construction, are described in this document.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y. or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups. Examples of cycloalkyl groups include, but are not limited to cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation or cement construction. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

A "subterranean structure" includes oil and gas wells, as well as other cement constructions, such as buildings, bunkers, storage, underground architectures, semi-subterranean structures, tunnels, caves, mines, to avoid and mitigate leaks, loss of structural integrity, and fluid migrations.

As used herein, "treatment of a subterranean formation or structure" can include any activity directed to extraction of water or petroleum materials from a subterranean petroleum- or water-producing formation or region, for example, including drilling, stimulation, hydraulic fracturing, cleanup, acidizing, completion, cementing, remedial treatment, and abandonment.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (for example, a fatty acid methyl ester), 2-butoxy ethanol, butyl acetate, butyl lactate, furfuryl acetate, dimethyl sulfoxide, dimethyl formamide, a petroleum distillation product of fraction (for example, diesel, kerosene, naphthas) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %. 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Compositions for Treating a Subterranean Formation or Cement Construction

Provided in this disclosure are compositions that can be used as a sealant resin. In some embodiments, the compositions are useful for the recovery of oil and gas wells that have been shut-in due to, for example, fractured cement sheaths in order to minimize losses in production. The compositions provided in this disclosure include a poly-alkene maleic anhydride copolymer, a polyethyleneglycol (PEG), and a crosslinker selected from an ethyleneamine, a benzenetricarboxylic acid, a benzimidazole, and combinations thereof. The poly-alkene maleic anhydride copolymer includes repeat units I and II:

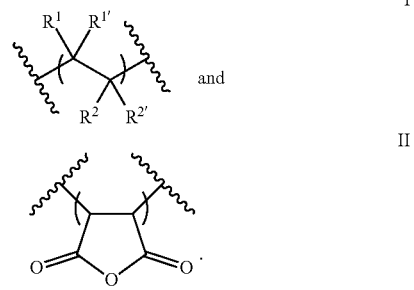

$R^1$, $R^{1'}$, $R^2$, and $R^{2'}$ are each independently selected from —H and —($C_1$-$C_5$)alkyl.

The composition can also include reaction products of the poly-alkene maleic anhydride copolymer and the one or more crosslinkers. In some embodiments, the composition includes reaction products of a poly-butene maleic anhydride copolymer. In some embodiments, the composition includes reaction products of a poly-isobutylene maleic anhydride copolymer.

In some embodiments, $R^1$, $R^{1'}$, $R^2$, and $R^{2'}$ are each independently selected from —H and —$CH_3$. In some embodiments, one of $R^1$ and $R^{1'}$ is H and the other is —$CH_3$. In some embodiments, one of $R^2$ and $R^{2'}$ is H and the other is —$CH_3$. In some embodiments, one of $R^1$ and $R^{1'}$ is H and the other is —$CH_3$; and one of $R^2$ and $R^{2'}$ is H and the other is —$CH_3$. In some embodiments, $R^1$ and $R^{1'}$ are each H and $R^2$ and $R^{2'}$ are each independently selected from —H, and —$CH_3$. In some embodiments, $R^1$ and $R^{1'}$ are each H and $R^2$ and $R^{2'}$ are each —$CH_3$.

In some embodiments, repeat unit I is selected from:

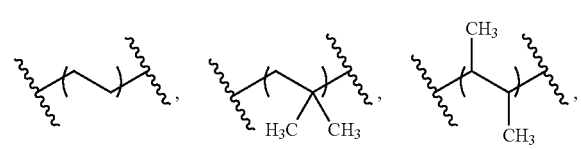

and combinations thereof. In some embodiments, repeat unit I has the structure:

In some embodiments, repeat unit I has the structure:

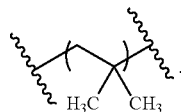

In some embodiments, repeat unit I has the structure:

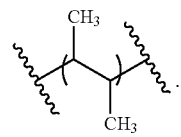

Examples of suitable poly-alkene maleic anhydride copolymers containing repeat units I and II include ISOBAM® polymers from Kuraray Company (Tokyo, Japan), ethylene-maleic anhydride copolymers and propylene-maleic anhydride copolymers from Honeywell Corporation (USA), and ZEMAC® copolymers from Vertellus (Spain). In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer. In some embodiments, the poly-isobutylene maleic anhydride copolymer containing repeat units I and II is Isobam® 104.

In some embodiments, the poly-alkene maleic anhydride copolymer is mixed with polyethylene glycol (PEG). The PEG is used in the compositions of the present disclosure as one or more of a polymer, a structure directing agent, and a crosslinker. The average molecular weight of the PEG is about 200 kDa to about 4,000,000 kDa, for example, about 500 kDa to about 2,000,000 kDa, about 1000 kDa to about 200,000 kDa, about 5000 kDa to about 50,000 kDa, or about 10,000 kDa to about 30,000 kDa. In some embodiments, the average molecular weight of the PEG is about 200 kDa, about 300 kDa, about 400 kDa, about 500 kDa, about 540 kDa, about 600 kDa, about 1000 kDa, about 1450 kDa, about 1500 kDa, about 1540 kDa, about 2000 kDa, about 3350 kDa, about 4000 kDa, about 4600 kDa, about 5000 kDa, about 6000 kDa, about 8000 kDa, about 20,000 kDa, about 30,000 kDa, about 50,000 kDa, about 100,000 kDa, about 250,000 kDa, about 500,000 kDa, about 1,000,000 kDa, about 2,000,000 kDa, and about 4,000,000 kDa. In some embodiments, the average molecular weight of the PEG is about 20,000 kDa. Examples of commercially available PEG that can be used in the compositions of the present disclosure include, but are not limited to, those sold by Wako Pure Chemical Industries, Ltd., Sanyo Chemical Industries, Ltd. (tinder the trade names of MACROGOL®), and by Dow Chemical Company (under the trade names of CARBOWAX®).

In some embodiments, the poly-alkene maleic anhydride copolymer has a weight-average molecular weight of about 10,000 Da to about 500,000 Da. For example, the poly-alkene maleic anhydride copolymer can have a weight-average molecular weight of about 10,000-100,000 Da, about 20,000-90,000 Da, about 30,000-70,000 Da, about 40,000-60,000 Da, or a weight-average molecular weight of about 45,000-55,000 Da, or a weight-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. In some embodiments, the poly-alkene maleic anhydride copolymer has a weight-average molecular weight of about 100,000-500,000 Da, about 200,000-400,000 Da, about 250,000-350,000 Da or a weight-average molecular weight of about 100,000 Da, 150,000 Da, 200,000 Da, 250,000 Da, 300,000 Da, 350,000 Da, 400,000 Da, 450,000 Da or about 500,000 Da. In some embodiments, the poly-alkene maleic anhydride copolymer has a weight-average molecular weight of about 50,000 Da. In some embodiments, the poly-alkene maleic anhydride copolymer has a weight-average molecular weight of about 300,000 Da. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments, the poly-alkene maleic anhydride copolymer has a number-average molecular weight of about 10,000 Da to about 500,000 Da. For example, the poly-alkene maleic anhydride copolymer can have a number-average molecular weight of about 10,000-100,000 Da, about 20,000-90,000 Da, about 30,000-70,000 Da, about 40,000-60,000 Da, or a number-average molecular weight of about 45,000-55,000 Da or a number-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. In some embodiments, the poly-alkene maleic anhydride copolymer has a number-average molecular weight of about 100,000-500,000 Da, about 200,000-400,000 Da, about 250,000-350,000 Da or a number-average molecular weight of about 100,000 Da, 150,000 Da, 200,000 Da, 250,000 Da, 300,000 Da, 350,000 Da, 400,000 Da, 450,000 Da or about 500,000 Da. In some embodiments, the poly-alkene maleic anhydride copolymer has a number-average molecular weight of about 50,000 Da. In some embodiments, the poly-alkene maleic anhydride copolymer has a number-average molecular weight of about 300,000 Da. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments, PEG primarily serves as a supportive scaffold, or a structure directing polymer, without degradation when tested up to 400 degrees Fahrenheit. The overall resin system is optimized and characterized by its strength, heat resistivity, and stability (with no syneresis at room temperature). PEG also can serve to crosslink any free carboxyl or amine group in the polymer matrix. Uniformity of the resin with PEG is obtained, with predictable and reproducible mechanical properties such as elastic modulus.

In the compositions of the present disclosure, the crosslinker is selected from an ethyleneamine, a benzenetricarboxylic acid, a benzimidazole, and combinations thereof.

In some embodiments, the crosslinker contains an ethyleneamine. In some embodiments, the ethyleneamine is selected from ethylenediamine (EDA), diethylenetriamine (DETA), aminoethylpiperazine (AEP), triethylenetetraamine (linear-TETA), tris(2-aminoethyl)amine (branched-TETA), N,N'-bis-(2-aminoethyl)piperazine (bis-AEP), N-[(2-aminoethyl)2-aminoethyl]piperazine), piperazinoethylethylenediamine (PEEDA), tetraethylenepentamine (TEPA), and mixtures thereof. In some embodiments, the ethyleneamine is TEPA.

In some embodiments, the crosslinker contains a benzenetricarboxylic acid. In some embodiments, the benzenetricarboxylic acid is selected from 1,2,3-benzenetricarboxylic acid (hemimellitic acid), 1,2,4-benzenetricarboxylic acid (trimellitic acid), 1,3,5-benzenetricarboxylic acid (trimesic acid), and mixtures thereof. In some embodiments, the benzenetricarboxylic acid is trimesic acid.

In some embodiments, the crosslinker contains a benzimidazole. Benzimidazoles can be used to facilitate anionic polymerization and serve as a co-curing agent, along with a trifunctional monomer. These highly aromatic monomers can yield a resin with higher heat resistance once the gel cures. In some embodiments, the benzimidazole is a substituted benzimidazole. In some embodiments, the benzimidazole is a phenylbenzimidazole having the following structure:

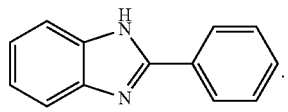 [SMILES: c1ccc(-c2nc3ccccc3[nH]2)cc1]

In some embodiments, the phenylbenzimidazole is a substituted phenylbenzimidazole, wherein one or more substituents are present at any of the open positions. In some embodiments, the phenylbenzimidazole is substituted with one or more of —OH, —OR, —$NH_2$, —NHR, —$NR_2$, —NHCOR, —SH, —SR, —SeR, —Cl, —Br, —I, —F, —CN, and —$CO_2R$, and combinations thereof, wherein R represents an alkyl group. In some embodiments, the phenylbenzimidazole is substituted with one or more —$NH_2$ groups. In some embodiments, the phenylbenzimidazole is substituted with two —$NH_2$ groups. In some embodiments, the benzimidazole has at least two, such as two, three, or four nucleophilic groups, for example, —$NH_2$ groups, and allows for the nucleophilic attack on electrophiles to form many crosslinking bonds between the individual components of the compositions of the present disclosure. In some embodiments, the electrophile is a benzenetricarboxylic acid. In some embodiments, the benzenetricarboxylic acid is trimesic acid. In some embodiments, the benzimidazole is 5-amino-2-(4-aminophenyl)benzimidazole (APBZ).

Examples of suitable benzimidazoles include, but are not limited to, 6-bromo-4-azabenzimidazole, 4-azabenzimidazole, 5-azabenzimidazole, 2-bromo-1H-benzimidazole, 6-bromo-1H-benzimidazole, 5-bromo-1,3-dihydrobenzoimidazol-2-one, 2-chlorobenzimidazole, 5-chlorobenzimidazole, 5,6-dichloro-1H-benzimidazole hydrochloride, 5-fluoro-1H-benzimidazole, 2-mercapto-5-benzimidazolesulfonic acid sodium salt dihydrate, 2-mercapto-5-nitrobenzimidazole, 5-nitro-2-benzimidazolinone, benzimidazole, 1H-benzoimidazol-4-ol, 2-hydroxybenzimidazole, 1H-benzimidazole-2-sulfonic acid, 2-mercaptobenzimidazole, 1-aminobenzimidazole, 2-aminobenzimidazole, 5-aminobenzimidazole, 6-aminobenzimidazole, 5-amino-1,3-dihydro-2H-benzimidazol-2-one, 5-amino-2-mercaptobenzimidazole, 5,6-diamino-1,3-dihydro-2H-benzimidazol-2-one, cis-octahydro-2H-benzimidazol-2-one, 4-chloro-6-(trifluoromethyl)benzimidazole, 5-chloro-2-(trichloromethyl)benzimidazole, 6-chloro-1H-benzimidazole-2-carboxylic acid monohydrate, 5-cyanobenzimidazole, 5-(difluoromethoxy)-2-mercapto-1H-benzimidazole, 5-amino-2-(trifluoromethyl)benzimidazole, 1H-benzimidazole-2-carboxylic acid, 1H-benzimidazole-2-carboxylic acid monohydrate, 1H-benzimidazole-6-carboxylic acid, 5-benzimidazolecarboxylic acid, 2-mercapto-1H-benzimidazole-6-carboxylic acid, 2-sulfanyl-1H-benzimidazole-5-carboxylic acid, 6-bromo-1-methyl-1H-benzo[d]imidazole, 2-(chloromethyl)benzimidazole, (5-chloro-1H-benzimidazol-2-yl)methanol, (5-chloro-1H-benzimidazol-2-yl)methylamine dihydrochloride, 1-methylbenyzimidazole, 2-methylimidazole, 5-methylbenzimidazole, 1H-benzimidazol-5-ylmethanol, 2-benzimidazolemethanol, 5-methoxybenzimidazole, 5-methoxy-2-benzimidazolethiol, 1-methyl-1H-benzimidazole-2-thiol, 2-(methylthio)benzimidazole, 1H-benzimidazol-2-ylmethanethiol hydrochloride, 1-methyl-1H-benzimidazol-6-amine, 2-(aminomethyl)benzimidazole dihydrochloride, 2-amino-1-methylbenzimidazole, 5-methyl-1H-benzimidazol-2-amine, 5-amino-6-methoxy-1,3-dihydro-2H-benzimidazol-2-one, 1-(methylsulfonyl)-1H-benzimidazol-2-amine, 2-guanidinobenzimidazole, (5-amino-1H-benzimidazol-2-yl)methanol dihydrochloride, (2-benzimidazolyl)acetonitrile, 4-(1H-benzimidazol-2-yl)-1,2,5-oxadiazol-3-ylamine, 2-(2-chloro-1H-benzimidazol-1-yl)ethanol, 2-(6-chloro-1H-benzimidazol-2-yl)ethanol, carbendazim, 1-(2-bromoethyl)-1H-benzimidazole hydrobromide, 2-(chloromethyl)-6-methyl-1H-benzimidazole hydrochloride, 5,6-dimethylbenzimidazole, (6-methoxy-1H-benzimidazol-2-yl)methanol, 5,6-dimethoxybenzimidazole, 2-(1H-benzoimidazol-2-yl)-ethylamine, 2-(2-aminoethyl)benzimidazole dihydrochloride, 5,6-dimethyl-1H-benzimidazol-7-amine, hydrochloride, 1-(4-methyl-1H-benzimidazol-2-yl)methanamine dihydrochloride, 1-(5-methyl-1H-benzimidazol-2-yl)methanamine dihydrochloride, 4,5-dimethyl-1H-benzimidazol-6-amine dihydrochloride, 1-(5-methoxy-1H-benzimidazol-2-yl)methanamine dihydrochloride, 2-(5-amino-1H-benzimidazol-1-yl)ethanol dihydrochloride, 1-ethyl-2-hydrazino-1H-benzimidazole hydrate, 5-hydroxythiabendazole, 2-[2-(trifluoromethyl)-1H-benzimidazol-1-yl]ethanol, 2-methoxycarbonylamino-1H-benzoimidazole-6-carboxylic, acid, 1-(1-methyl-1H-benzimidazol-2-yl)ethanone, 1-isopropenyl-2-benzimidazolidinone, 1,2-dimethyl-1H-benzimidazole-5-carboxylic acid, 2-benzimidazolepropionic acid, 1-(3-chloropropyl)-1,3-dihydro-2h-benzimidazol-2-one, 2-(1H-benzimidazol-1-yl)propanoic acid hydrochloride, 1-(5,6-dimethyl-1H-benzimidazol-2-yl)methanamine, 2-ethyl-1-methyl-1H-benzoimidazol-5-ylamine, 3-(1H-benzimidazol-1-yl)propan-1-amine, 2-(3-aminopropyl)-1H-benzimidazol-5-ol, 1-(5-methyl-1H-benzimidazol-2-yl)ethanamine dihydrochloride, 2-(1-methyl-1H-benzimidazol-2-yl)ethanamine dihydrochloride, 2-(5-methyl-1-1H-benzimidazol-2-yl)ethanamine dihydrochloride, 2-(7-methyl-1H-benzimidazol-2-yl)ethanamine dihydrochloride, 2-isopropyl-1H-benzimidazol-5-amine dihydrochloride, N-methyl-1-(5-methyl-1H-benzimidazol-2-yl)methanamine dihydrochloride, 1-allyl-1H-benzimidazole-2-carbaldehyde, 1-isopropyl-1H-benzimidazole-2-carbaldehyde, (5,7-dimethyl-1H-benzimidazol-2-yl)acetic acid, (4-methyl-1H-benzoimidazol-2-ylmethoxy)acetic acid, [2-(methoxymethyl)-1H-benzimidazol-1-yl]acetic acid, 3-(5-methyl-1H-benzimidazol-2-yl)propan-1-ol, 1-isobutyl-1H-benzimidazol-2-amine, 2-tert-butyl-1H-benzimidazol-5-amine, 2-methyl-1-propyl-1H-benzimidazol-5-amine dihydrochloride, 3-(1-methyl-1H-benzimidazol-2-yl)-1-propanamine dihydrochloride hydrate, 5-(1H-benzoimidazol-2-ylsulfanyl)-furan-2-carbaldehyde, 2-(2-pyridyl)benzimidazole, 2-(3-pyridyl)-1H-benzimidazole, 4-[2-(trifluoromethyl)-1H-benzimidazol-1-yl]butanoic acid, 2-(2-ethyl-benzoimidazol-1-yl)-propionic acid, 3-(5,7-dimethyl-1H-benzimidazol-2-yl)propanoic acid, 2-piperidin-3-yl-1H-benzimidazole, 4-(2-keto-1-benzimidazolinyl)piperidine, oxibendazole, 1-(piperidin-3-yl)-1H-benzo[d]imidazole hydrochloride, 2-(2-bromophenyl)-1H-benzimidazole, 2-(2-chlorophenyl)benzimidazole, 2-phenylbenzimidazole, 2-(2-hydroxyphenyl)-1H-benzimidazole, 2-phenyl-5-benzimidazolesulfonic acid, 2-(2-aminophenyl)-1H-benzimidazole, 4-(1H-benzimidazol-1-yl)aniline, N-(1H-benzoimidazol-2-yl)-benzene-1,2-diamine, 2-(piperidin-3-ylmethyl)-1H-benzimidazole, 4-methyl-2-piperidin-3-yl-1H-benzimidazole dihydrochloride, 2-(2-bromophenyl)-1H-benzoimidazole-5-carboxylic acid, 2-chloro-1-(4-fluorobenzyl)benzimidazole, 4-(1H-1,3-benzimidazol-1-yl)benzenecarbaldehyde, 3-(1H-benzoimidazol-2-yl)-benzoic acid, 2-(2-bromophenyl)-1-methyl-1H-benzimidazole, 2-benzenesulfonylmethyl-1H-benzoimidazole, 1-benzyl-1H-benzoimidazol-2-ylamine, 2-benzyl-1H-benzimidazol-5-amine, methyl 1-(butylcarbamoyl)-2-benzimidazolecarbamate, fenbendazole, 2-ferrocenyl-benzimidazole, 2-ferrocenyl-6-methylbenzimidazole, 2-[3-(2-benzimidazolyl)-phenyl]-5-methyl-4-phenyl-thiazole, 2-[3-(2-benzimidazolyl)-phenyl)-4-phenylthiazole, 2-[4-(2-benzimidazolyl)-phenyl]-4-phenylthiazole, 2-[4-(2-benzimidazolyl)-phenyl]-5-methyl-4-phenyl-thiazole, 6-methyl-2-(2-thienyl)benzimidazole, and ethyl 2-[4-(2-benzimidazolyl)-phenyl]-4-methylthiazole-5-carboxylate. In some embodiments, the benzimidazole is 5-amino-2-(4-aminophenyl)benzimidazole (APBZ).

In some embodiments of the compositions of the present disclosure, the crosslinker contains an ethyleneamine, a benzenetricarboxylic acid, and a benzimidazole. In some embodiments, the crosslinker contains TEPA, trimeric acid, and APBZ.

Without wishing to be bound by any theory, it is believed that the formation of a polyaramide system (a polymer containing aromatic amides), such as formed by crosslinking the poly-alkene maleic anhydride copolymer, PEG, and crosslinker containing an ethyleneamine, a benzenetricarboxylic acid, a benzimidazole, and combinations thereof, allows for increased ductility and enhanced performance of a sealant resin that is thermally stable up to at least 400° F. This is made possible by the high polymer density, crosslinking, and elasticity of the resin. The compositions of the present disclosure also remain water-thin to allow for high-volume application to seal the smallest of fractures in cement.

Without wishing to be bound by any theory, it is believed that the crosslinker, for example, a crosslinker containing an amine (—NHR), reacts first with the maleic anhydride moiety of the copolymer, followed by reaction of any free maleic anhydride with the —OH of the PEG. Thus, in some embodiments, PEG acts as a scaffold and then as a crosslinker, if permitted. In some embodiments, the maleic anhydride converts to maleimide, and any free amine reacts with the PEG. This can further increase the overall crosslinking of the resin, which can increase the strength of the resin. This is especially true as the resin sets at higher temperatures and drives the production of maleimide.

In some embodiments, the compositions of the present disclosure contain about 15 wt % to about 50 wt % of the poly-alkene maleic anhydride copolymer, where the copolymer comprises repeat units I and II, and a PEG. For example, the compositions can include about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, about 40 wt % to about 50 wt %, about 40 wt % to about 45 wt %, about 45 wt % to about 50 wt %, or about 15 wt %, about 20 wt %, about 25 wt %, about 30 wt %, about 35 wt %, about 40 wt %, about 45 wt %, or about 50 wt % of the poly-alkene maleic anhydride copolymer and PEG. In some embodiments, the composition contains about 20 wt % to about 40 wt % of the poly-alkene maleic anhydride copolymer and PEG. In some embodiments, the composition contains about 30 wt % of the poly-alkene maleic anhydride copolymer and PEG. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments, the compositions of the present disclosure contain about 15 wt % to about 50 wt % of the poly-alkene maleic anhydride copolymer, where the copolymer contains about 10 wt % to about 45 wt % of repeat units I and II and about 5 wt % to about 15 wt % of a PEG, for example, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 45 wt %, about 25 wt % to about 40 wt %, about 25 wt % to about 35 wt %, about 25 wt % to about 30 wt %, about 30 wt % to about 45 wt %, about 30 wt % to about 40 wt %, about 30 wt % to about 35 wt %, about 35 wt % to about 45 wt %, about 35 wt % to about 40 wt %, or about 40 wt % to about 45 wt % of repeat units I and II, and about 5 wt % to about 15 wt %, about 5 wt % to about 10 wt %, about 10 wt % to about 20 wt %, about 10 wt % to about 15 wt %, or about 15 wt % to about 20 wt % of a PEG, such as about 10 wt %, 15 wt %, 20 wt %, 25 wt %, 30 wt %, 35 wt %, 40 wt %, 45 wt %, or about 50 wt % of repeat units I and II, and about 5 wt % to about 15 wt %, about 5 wt % to about 12 wt %, about 5 wt % to about 10 wt %, about 5 wt % to about 7 wt %, about 7 wt % to about 15 wt %, about 7 wt % to about 12 wt %, about 7 wt % to about 10 wt %, about 10 wt % to about 15 wt %, about 10 wt % to about 12 wt %, or about 12 wt % to about 15 wt % of a PEG. In some embodiments, the compositions contain about 20 wt % to about 30 wt % of a poly-alkene maleic anhydride copolymer and about 5 wt % to about 15 wt % of a PEG. In some embodiments, the compositions contain about 20 wt % of the poly-alkene maleic anhydride copolymer, with repeat units I and II, and about 10 wt % of a PEG. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments, the composition includes an aqueous carrier. The aqueous carrier can include water, brine, produced water, flowback water, brackish water, Arab-D-brine, sea water, or combinations thereof. In some embodiments, the aqueous carrier is about 1% to about 99% by weight of the composition. In some embodiments, the aqueous carrier is about 5% to about 99% by weight of the composition. For example, the aqueous carrier can be about 10%-98%, about 20%-98%, about 30%-98%, about 40%-98%, about 50%-98%, about 60%-98%, about 70%-98%, about 80%-98%, or about 85%-98% by weight of the composition or about 10%, about 20%, about 30%, about 40%, about 50%, about 60%, about 70%, about 80%, about 85%, about 90%, about 91%, about 92%, about 93%, about 94%, about 95%, about 96%, about 97%, or about 98% by weight of the composition. In some embodiments, the aqueous carrier is about 60-68% by weight of the composition. In some embodiments, the aqueous carrier is about 63% by weight of the composition.

The compositions of the present disclosure can contain an aqueous carrier. This results in an environmentally-friendly system. Because water begins to boil at its boiling point (i.e., 212° F.), water-based systems typically have a temperature limit. The compositions of the present disclosure, however, can be used at temperatures above the boiling point of the solvent (water) due to the robustness of the compositions. The resin of the compositions of the present disclosure sets uniformly and with mechanical strength. In some embodiments, the compositions are used in applications at temperatures of about 200° F. to about 400° F., such as about 200° F., about 250° F., about 300° F., about 350° F., or about 400° F.

The compositions of the present disclosure have a basic pH. By maintaining a pH that is similar to cement (for example, greater than about pH 12), the risk of gel syneresis and incompatibility for cement remediation applications is removed and avoided. For example, the compositions can have a pH of about or greater than 12, for example, about 12 to about 15. In some embodiments, the pH of the composition is about 12 to about 15, about 12 to about 14, about 12 to about 13, about 13 to about 15, about 13 to about 14, about 14 to about 15, or about 12, about 13, about 14, or about 15. In some embodiments, the composition has a pH of about 12 to about 15. In some embodiments, the composition has a pH of about 14.

The compositions of the present disclosure maintained a water-thin rheology, which is important in order to allow the compositions to reach the ends of the fractures and form a seal after setting. The compositions of the present disclosure have a viscosity of about 2000 mPa·s to about 10,000 mPa·s at 22° C., for example, about 2000 mPa·s to about 9000 mPa·s, about 2000 mPa·s to about 8000 mPa·s, about 2000 mPa·s to about 7000 mPa·s, about 2000 mPa·s to about 6000 mPa·s, about 2000 mPa·s to about 5000 mPa·s, about 2000 mPa·s to about 4000 mPa·s, about 2000 mPa·s, to about 3500 mPa·s, about 2000 mPa·s to about 3000 mPa·s, about 3000 mPa·s to about 10,000 mPa·s, about 3000 mPa·s to about 9000 mPa·s, about 3000 mPa·s to about 8000 mPa·s, about 3000 mPa·s to about 7000 mPa·s, about 3000 mPa·s to about 6000 mPa·s, about 3000 mPa·s to about 5000 mPa·s, about 3000 mPa·s to about 4000 mPa·s, about 3000 mPa·s to about 3500 mPa·s, about 3500 mPa·s to about 10,000 mPa·s, about 3500 mPa·s to about 9000 mPa·s, about 3500 mPa·s to about 8000 mPa·s, about 3500 mPa·s to about 7000 mPa·s, about 3500 mPa·s to about 6000 mPa·s, about 3500 mPa·s to about 5000 mPa·s, about 3500 mPa·s to about 4000 mPa·s, about 4000 mPa·s to about 10,000 mPa·s, about 4000 mPa·s to about 9000 mPa·s, about 4000 mPa·s to about 8000 mPa·s, about 4000 mPa·s to about 7000 mPa·s, about 4000 mPa·s to about 6000 mPa·s, about 4000 mPa·s to about 5000 mPa·s, about 5000 mPa·s to about 10,000 mPa·s, about 5000 mPa·s to about 9000 mPa·s, about 5000 mPa·s to about 8000 mPa·s, about 5000 mPa·s to about 7000 mPa·s, about 5000 mPa·s to about 6000 mPa·s, about 6000 mPa·s to about 10,000 mPa·s, about 6000 mPa·s to about 9000 mPa·s, about 6000 mPa·s to about 8000 mPa·s, about 6000 mPa·s to about 7000 mPa·s, about 7000 mPa·s to about 10,000 mPa·s, about 7000 mPa·s to about 9000 mPa·s, about 7000 mPa·s to about 8000 mPa·s, about 8000 mPa·s to about 10,000 mPa·s, about 8000 mPa·s to about 9000 mPa·s, or about 9000 mPa·s to about 10,000 mPa·s, or about 2000 mPa·s, about 3000 mPa·s, about 3500 mPa·s, about 4000 mPa·s, about 5000 mPa·s, about 6000 mPa·s, about 7000 mPa·s, about 8000 mPa·s, about 9000 mPa·s, or about 10,000 mPa·s at 22° C. In some embodiments, the viscosity of the compositions is about 3000 to about 5000 mPa·s at 22° C. In some embodiments, the viscosity of the compositions is about 5000 mPa·s at 22° C.

In some embodiments, the density of the cured composition is greater than about 1.10 g/cm$^3$, such as between about 1.11 g/cm$^3$ and about 1.50 g/cm$^3$. In some embodiments, the density of the cured composition is about 1.11 g/cm$^3$, 1.12 g/cm$^3$, 1.13 g/cm$^3$, 1.14 g/cm$^3$, 1.15 g/cm$^3$, 1.16 g/cm$^3$, 1.17 g/cm$^3$, 1.18 g/cm$^3$, 1.19 g/cm$^3$, 1.2 g/cm$^3$, 1.25 g/cm$^3$, 1.3 g/cm$^3$, 1.35 g/cm$^3$, 1.4 g/cm$^3$, 1.45 g/cm$^3$, or 1.5 g/cm$^3$. In some embodiments, the density of the cured composition is about 1.15 g/cm$^3$.

In some embodiments, the composition of the present disclosure has an elasticity of greater than about 2000 N/m, such as between about 2000 N/m and about 10,000 N/m. In some embodiments, the elasticity of the cured composition is about 2000 N/m, about 2500 N/m, about 2800 N/m, about 3000 N/m, about 3400 N/m, about 4000 N/m, about 4500 N/m, about 5000 N/m, about 5500 N/m, about 6000 N/m, about 6100 N/m, about 6500 N/m, about 7000 N/m, about 8000 N/m, about 9000 N/m, or about 10,000 N/m. In some embodiments, the elasticity of the cured composition is about 3400 N/m.

In some embodiments, the composition of the present disclosure has a density greater than about 1.10 g/cm$^3$ and an elasticity greater than about 2000 N/m. In some embodiments, the composition has a density between about 1.11 g/cm$^3$ and about 1.50 g/cm$^3$ and an elasticity between about 2000 N/m and about 10,000 N/m. In some embodiments, the composition has a density of about 1.15 g/cm$^3$ and an elasticity of about 3400 N/m.

Also provided in the present disclosure is a composition containing about 20 wt % to about 30 wt % of a poly-alkene maleic anhydride copolymer comprising: repeat units I and II:

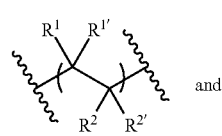

and

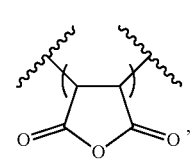

where repeat unit I is selected from:

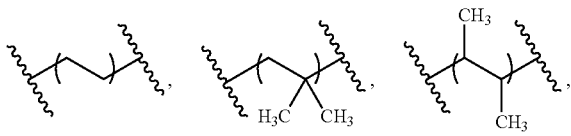

and combinations thereof; a polyethylene glycol (PEG); and a crosslinker selected from an ethyleneamine, a benzenetricarboxylic acid, a benzimidazole, and combinations thereof, where the pH of the composition is between about 12 to about 15. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer. In some embodiments, the crosslinker contains TEPA, trimesic acid, and APBZ. In some embodiments, the composition has a density of greater than about 1.10 g/cm$^3$ and an elasticity of greater than about 2000 N/m.

Additional Components

In some embodiments, the compositions including the poly-alkene maleic anhydride copolymer, PEG, and crosslinker can further include one or more suitable additional components.

In some embodiments, the compositions of the present disclosure contain a pH adjuster. Examples of suitable pH adjusters include, but are not limited to, an organic amine, hydrochloric acid, ammonium hydroxide, sodium hydroxide, sodium carbonate, sodium hydrogen carbonate, sodium monohydrogen phosphate, sodium dihydrogen phosphate, ammonium hydrogen carbonate, and aqueous ammonia. In some embodiments, the pH adjuster is sodium hydroxide (NaOH).

In some embodiments, the compositions of the present disclosure contain a gel time control agent. The gel time control agent can accelerate or retard the crosslinking of the poly-alkene maleic anhydride copolymer and the crosslinker and thus can accelerate or retard the gelling of the composition. Suitable gel time control agents include, but are not limited to, salts that yield a basic solution when dissolved in water, salts that yield an acidic solution when dissolved in water, uncharged organic molecules that yield a basic solution when dissolved in water, uncharged organic molecules that yield an acidic solution when dissolved in water (for example, citric acid), and pH buffers. Salts and uncharged organic molecules that yield a basic solution when dissolved in water, such as sodium hexametaphosphate, sodium bicarbonate, sodium carbonate, sodium tetraborate, trisodium phosphate (TSP) (Na$_3$PO$_4$), monoethanolamine, triethanolamine, and N,N-dimethyl ethylene diamine, can retard the gel time (decelerate gelling) of the composition. Salts and uncharged organic molecules that yield an acidic solution when dissolved in water, such as the pentasodium salt of amino trimethylene phosphonic acid), sodium acid pyrophosphate, disodium hydrogen phosphate, sodium dihydrogen phosphate, sodium hydrogen sulfate, and monosodium citrate, can shorten the gel time (accelerate gelling) of the composition. Buffers prepared from Bronsted acids and Bronsted bases, such as citric acid and sodium hydroxide, or Bronsted acids and Lewis bases, such as citric acid and monoethanolamine, and buffers produced from Lewis acids and Lewis bases, such as boric acid and monoethanolamine, can retard or accelerate the gel time of the composition. As such, compositions can be formulated with a buffer to achieve a gel time suitable for specific downhole requirements. Other examples of suitable Bronsted acids include mineral acids such as hydrochloric acid, sulfuric acid, phosphoric acid, and nitric acid, and organic acids such as tartaric acid and benzene sulfonic acid, and methane sulfonic acid. Other examples of Bronsted bases include sodium carbonate, sodium bicarbonate, potassium hydroxide, and ammonium hydroxide. Other examples of Lewis bases include diethanolamine, triethanolamine, triisopropanolamine, and dimethylaminoethanol. In some embodiments, the gel time control agent accelerates the crosslinking reaction and therefore accelerates formation of the gel from the maleic anhydride and the crosslinker. In some aspects of these embodiments, the acceleration occurs in the absence of set cement. In other aspects of these embodiments, the acceleration occurs in the presence of set cement. In some embodiments, the gel time control agent retards the crosslinking reaction, and therefore retards formation of the gel from the maleic anhydride and the crosslinker. In some aspects of these embodiments, the retardation of the crosslinking reaction occurs in the absence of set cement. In other aspects of these embodiments, the retardation of the crosslinking reaction occurs in the presence of set cement. In some embodiments, the compositions contain citric acid. In some embodiments, the compositions contain trisodium phosphate (TSP). In some embodiments, the compositions contain citric acid and TSP. When a gel time control agent is present in the compositions of the present disclosure, the total amount of gel time control agent is about 0.01 wt % to about 0.5 wt %.

The composition including the poly-alkene maleic anhydride copolymer, PEG, and crosslinker can be combined with any suitable downhole fluid before, during, or after the placement of the composition in a subterranean formation or cement construction or the contacting of the composition and a subterranean material or cement construction. For example, the composition including the poly-alkene maleic anhydride copolymer, PEG, and crosslinker can be combined with a downhole fluid above the surface, and then the combined composition is placed in a subterranean formation or cement construction or contacted with a subterranean material. Alternatively, the composition including the poly-alkene maleic anhydride copolymer, PEG and crosslinker can be injected into a subterranean formation or cement construction to combine with a downhole fluid, and the combined composition is contacted with a subterranean material or is considered to be placed in the subterranean formation or cement construction. In some embodiments, at least one of prior to, during, and after the placement of the composition in the subterranean formation or cement construction or contacting of the subterranean material and the composition, the composition is used in the subterranean formation or cement construction alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A pill is a relatively small quantity (for example, less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

Also described herein are crosslinked reaction products of the poly-alkene maleic anhydride copolymer, PEG, and the crosslinker. The crosslinked reaction product can form a sealant, such as a sealant gel. In some embodiments, the sealant is a stiff gel, a ringing gel, or a lipping gel.

Method of Treating a Subterranean Formation or Cement Construction

Also provided in the present disclosure is a method of treating a subterranean formation or cement construction including providing to a subterranean formation or cement construction a composition and crosslinking the composition to form a sealant. The composition includes a poly-alkene maleic anhydride copolymer, a PEG, and a crosslinker selected from an ethyleneamine, a benzenetricarboxylic acid, a benzimidazole, and combinations thereof. The poly-alkene maleic anhydride copolymer includes repeat units I and II, as described in the present disclosure, where $R^1$, $R^{1'}$, $R^2$, and $R^{2'}$ are each independently selected from —H and —($C_1$-$C_5$)alkyl. In some embodiments, the poly-alkene maleic anhydride copolymer is a poly-butene maleic anhydride copolymer. In some embodiments, the poly-alkene maleic anhydride copolymer is a poly-isobutylene maleic anhydride copolymer.

In some embodiments, the providing occurs above-surface. The providing can also occur in the subterranean formation or cement construction.

In some embodiments, forming the sealant occurs near at least one of a casing, a casing-casing annulus, a tubing-casing annulus, or a casing-formation annulus. In some embodiments, forming the sealant occurs in a void (for example, cracks, microannuli) in at least one of a cement, cement sheath, and pipe.

In some embodiments, forming the sealant prevents or retards undesired loss or flow of wellbore fluid into the formation or of formation fluids into the wellbore. In some embodiments, the sealant prevents or retards undesired loss or leak off of fluid into the formation.

Also provided in this disclosure is a method of preventing or alleviating loss of drilling fluid or other fluid circulation in a wellbore penetrating a subterranean formation. In some embodiments, the composition including the poly-alkene maleic anhydride copolymer, PEG, and crosslinker is provided in a weighted or unweighted "pill" for introduction into the wellbore. Such "pills" typically include the composition blended with a required amount of water, base oil, water base drilling fluid, or non-aqueous base drilling fluid and in some cases a weighting agent such as barite, calcium carbonate, or a salt. The amount of the composition used in the pill will depend on the size of the subterranean fracture, opening, or lost circulation zone to be treated. Multiple pills or treatments can be used if needed. In some embodiments, drilling is stopped while the pill containing the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry.

Also provided is a method of servicing a wellbore. The method includes providing a composition including a poly-alkene maleic anhydride copolymer and PEG as described in the present disclosure and a crosslinker within a portion of at least one of a wellbore, a cement construction, and a subterranean formation.

In some embodiments, the composition is introduced into at least one of a wellbore, a cement construction, and a subterranean formation using a pump. The poly-alkene maleic anhydride copolymer, PEG, and the crosslinker can be pumped together from at least one source or simultaneously from at least two different sources. Alternatively, the poly-alkene maleic anhydride copolymer and PEG can be pumped first and the crosslinker can be pumped second. Alternatively, the crosslinker can be pumped first and the poly-alkene maleic anhydride copolymer and PEG can be pumped second.

Other Applications

The compositions of the present disclosure can be used in a variety of applications, including, but not limited to, as secondary barriers above primary cement jobs, for high pressure squeeze jobs, for tight casing leaks, for remediation, as gravel packers, for permanent plug and abandonment, and in disposal wells. In some embodiments, the compositions are used as a self-leveling resin. In some embodiments, the compositions are used for bonding cement. In some embodiments, the compositions are used as a resin with a filler, for example, as a mixture with silica flour as a filler. The composition can be used with cement, such as Portland cement, and hydraulic systems. In some embodiments the solid content is a ratio of about 1:1 silica to resin, or about 1:2 silica to resin, or about 1:3 silica to resin, or about 1:4 silica to resin, or about 1:5 silica to resin, or about 2:3 silica to resin.

EXAMPLES

Example 1

A series of compositions (Systems A-E) that contained a polymer content ranging from 15% (System A—comparative sample) to more than 30% (System C) were prepared using the components shown in Table 1. Table 2 illustrates the specific components and amounts used in each of the compositions.

TABLE 1

Composition components

| Reagent | Abbreviation | CAS no. | Notes |
|---|---|---|---|
| Water | $H_2O$ | Houston tap | 40 ppm calcium |
| Sodium hydroxide | NaOH | 1310-73-2 | |
| Isobam 104 | I104 | 55893-87-3 | Poly-isobutylene maleic anhydride |
| Citric acid | CA | 77-92-9 | |
| Trisodium phosphate | TSP | 10101-89-0 | $Na_3PO_4$ |
| Amino(phenyl) benzimidazole | APBZ | 7621-86-5 | |
| Trimesic acid | TMA | 554-95-0 | |
| Polyethylene glycol | PEG | 25322-68-3 | MW 20,000 |
| Polyethyleneimine | PEI | 9002-98-6 | MW 60,000; 50% aq. solution |
| Tetraethylene pentamine | TEPA | 112-57-2 | |

TABLE 2

| Reagents (%) | System A | System B | System C | System D | System E |
|---|---|---|---|---|---|
| Isobam 104 | 15 | 20 | 20 | 20 | 20 |
| Citric acid | 2.4 | 0.2 | 0.2 | 0.2 | 0.2 |
| TSP | 0.5 | 0.05 | 0.05 | 0.05 | 0.05 |
| TEPA | 0.4 | 1.0 | 1.0 | 1.0 | 1.0 |
| NaOH | — | 4.5 | 4.5 | 4.5 | 4.5 |
| APBZ | — | 0.2 | 0.2 | 0.2 | 0.2 |
| TMA | — | 0.4 | 0.4 | 0.4 | 0.4 |
| PEG | — | — | 10 | — | 10 |
| PEI | — | — | — | 10 | 0.1 |

Viscosity and pH

Each of the compositions were clear yellow liquids prior to curing. The viscosity of the hydro region (G">G') was measured at 22° C. and is shown in Table 3. The pH of each of the compositions was kept between 12-15 in order to increase reagent solubility and for compatibility with cement surface chemistry. The high pH allowed for solubilization of the copolymer into solution and increased the polymer load of the compositions. Even though water was the main solvent, resins that had low viscosity and high ductility were obtained (see Table 3). The resins remained water-thin when the viscosity was within the range of 2,000-10,000 mPa·s. The polymer content was 15% (System A) to about 30% (Systems B-E); these compositions exhibited increased crosslinking as compared to System A.

TABLE 3

G" > G' (hydro region) viscosity

| | System A | System B | System C | System D | System E |
|---|---|---|---|---|---|
| Viscosity (22° C., mPa · s) | 7971 | 3615 | 4980 | 3948 | 8883 |

The high pH helped to maintain the low viscosity of the resin. At varying pHs, the resins behaved differently. A soft elastic and gummy-like resin was sought that could stretch and yield to the strains downhole, and not thermally degrade or soften with temperature. The pH of System C was varied by adjusting the molar concentration of NaOH, as shown in FIG. 1 and Table 4. An elastic-like resin, instead of a hard-set resin, is needed to withstand the cyclic stress-strain events downhole. As the pH increased to 14, the resin surprisingly became more ductile and soft. The highest pH value (pH 14.42) resulted in a gel that was not stiff, but rather a product that looked like putty. When the pH was closer to 13, the system was rigid, hard, and brittle to handle. These slight changes in the molarity concentrations of NaOH, had significant changes to resin performance and was used to control the ductility of the final product for a polymer resin that was more elastic.

TABLE 4 pH and NaOH molar concentration of System C

| pH | 12.80 | 14.05 | 14.21 | 14.42 |
|---|---|---|---|---|
| NaOH (molarity) | 0.06 | 1.13 | 1.62 | 2.60 |

Density and Elasticity

After curing, the density and elasticity of the cured, crosslinked compositions (G'>G") were measured and are shown in Table 5. Resin density was increased with the addition of PEG and/or PEI as a copolymer to obtain a system that was 70% water (like the human body). There was a correlation between the density of the material and the shear modulus (or elasticity). The PEG/PEI was not a crosslinker, but rather passive, increasing the body (or density) of the overall resin system. The most rigid resin was System D which contained PEI and had a density of 1.20 g/cm$^3$. System C had PEG and had a density of 1.15 g/cm$^3$.

TABLE 5

G' > G" (cured gel) density and elasticity

| | System A | System B | System C | System D | System E |
|---|---|---|---|---|---|
| Density (cured, g/cm$^3$) | 1.10 | 1.12 | 1.15 | 1.20 | 1.16 |
| Elasticity (cured, N/m) | 1200 | 2800 | 3400 | 6100 | 5000 |

Figure 2:
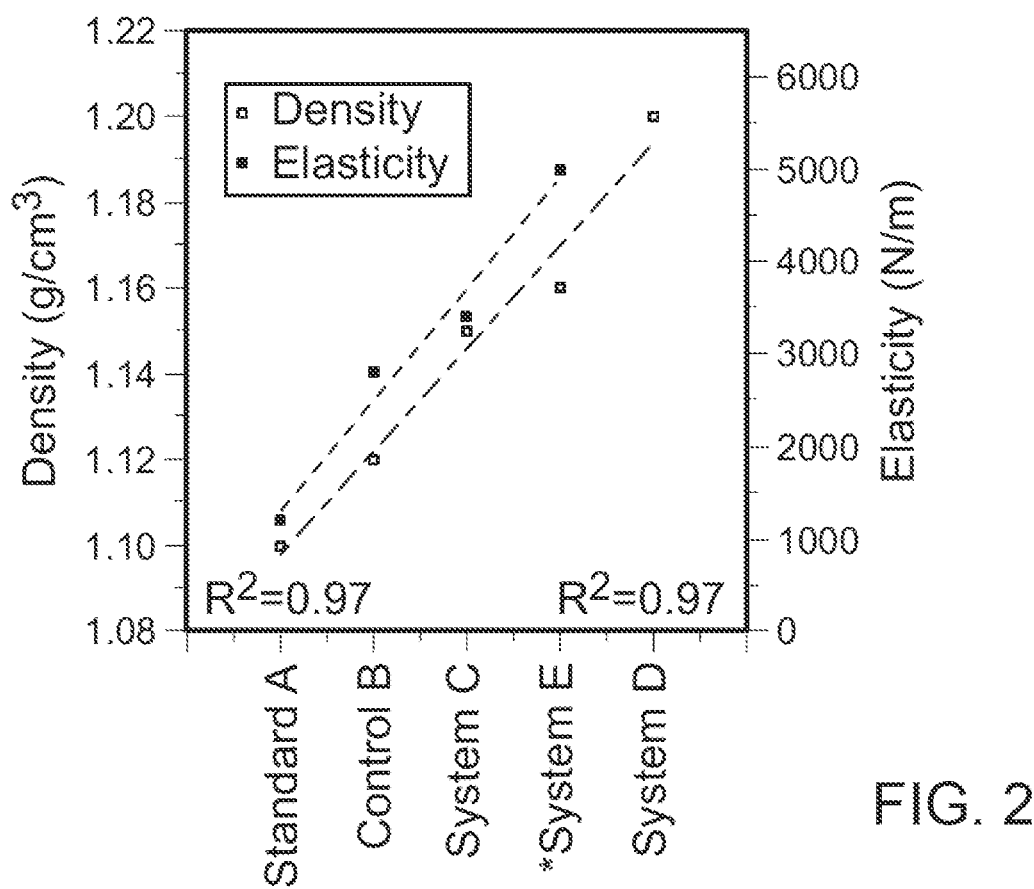
FIG. 2 is a graph showing the correlation between the density and the elasticity of each of the compositions, using Hook's law.

As shown in FIG. 2, the addition of crosslinking monomers in System B caused an increase in ductility by 57.1%. With the addition of copolymers to the base formulation, System C (with PEG) increased by 64.7% when compared to System A from Phase I; and System E (with both copolymers) increased its ductility by 76% (System E). No data was available for System D (with PEI), but its elasticity can be derived from FIG. 2 (black line) at 6100 N/m, which increased the rigidity of the material by 80%.

Figure 3:
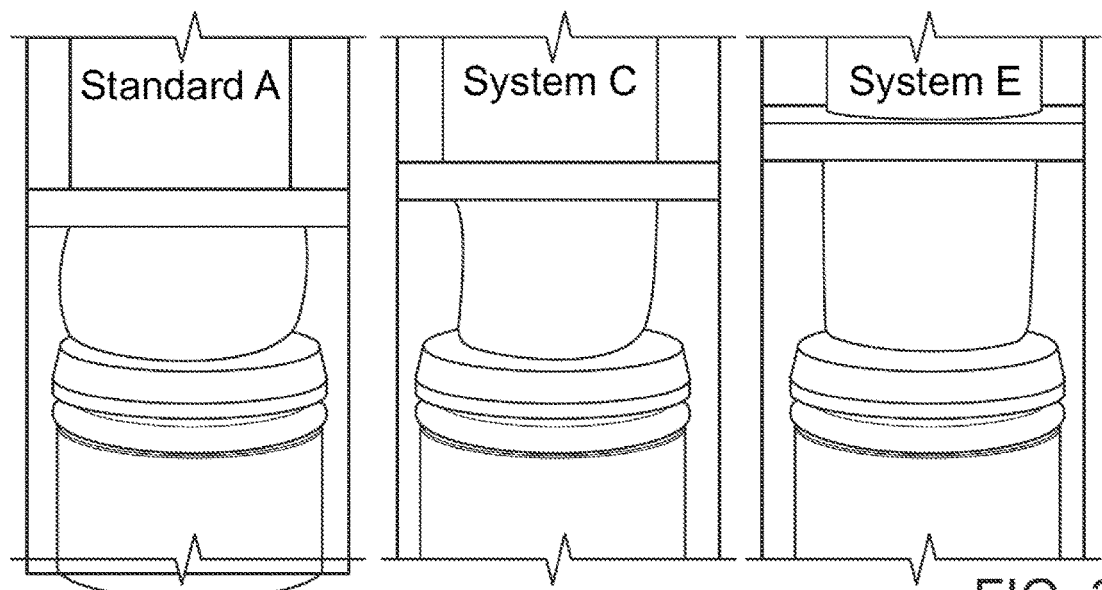
FIG. 3 illustrates the displacement tests used to measure elasticity using Hook's law for Systems A, C, and E. The applied force was 1.071 kg onto a sample with a 2-inch diameter. Displacement values were averaged together (n=2-4) to calculate the spring constant C in FIG. 4. System A had an overall spring constant of 1200 N/m; System C, 3400 N/m; and System E, 5000 N/m.

The co-polymers and reagents in the formulations had significant effects on the ductility of the polymer. For example, PEG (10%, w/w) kept the polymer soft and elastic (System C in FIG. 3). PEI (10%, w/w) made the polymer significantly harder and brittle, where PEI increased the hardness of the sample enough to make it difficult to handle (System D in FIG. 3). But the combination of PEG and PEI gave the resin system some positive traits (System E in FIG. 3).

To quantify this observation, the elasticity (in N/m) of the Systems A, C, and E were measured using Hooks' law. The setup consisted of a caliper and various weights to measure the small deformations of the gels (in meters), where the displacement or size of the deformation was directly proportional to the deforming force or load (in kg). Plotting a trendline gave the spring constant, or the elasticity of the samples. System A had the highest elasticity, System C was the next most elastic sample, and System E was the least elastic, where its small amount of PEI increased rigidity. See FIG. 3.

Aromaticity

The aromaticity of the compositions was increased by the use of the crosslinkers APBZ and TMA. The increase in aromaticity also increased the heat-resistance, ductility, and density of the resin product (Systems B-E). The products are stable gel systems up to about 400° F.

The crosslinkers were monomers used to increase the number of polyaramide bonds in the system. Monomer concentrations of APBZ and TMA were tailored to increase the degree of polymerization. These monomers were aromatic and multi-functionalized to react with polymers and copolymers, and increased bonding by forming more polyaramide bonds. The change in density from 1.10 to 1.20 showed how polymerization increased elasticity as well (also seen in Table 5).

Temperature Resistance

To measure temperature stability of the compositions, the shear modulus at various temperatures was measured. The shear modulus is the response of the material to an outside force and is a measure in its degree of deformation of the resin matrix to frictional forces in the opposite direction.

Figures 4A, 4B, 4C:
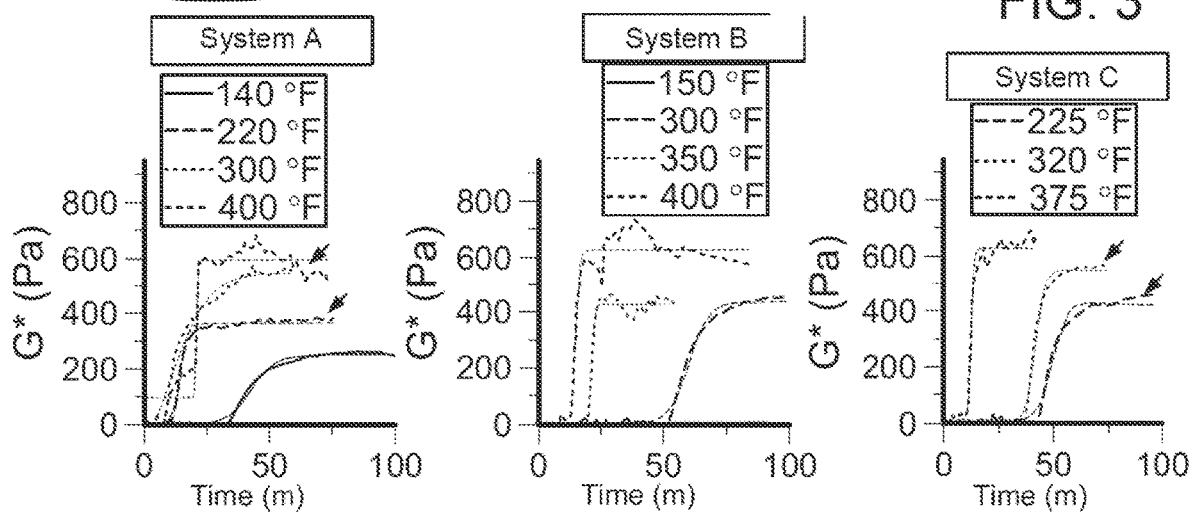
FIGS. 4A-4E show the shear modulus of Systems A-E at different temperatures at 1000 psi. The graphs show an elastic slope and the final G* value that is used for comparison. Systems highlighted by arrows were graphed for comparison with System A in FIGS. 5A-5B.
Figures 4D, 4E:
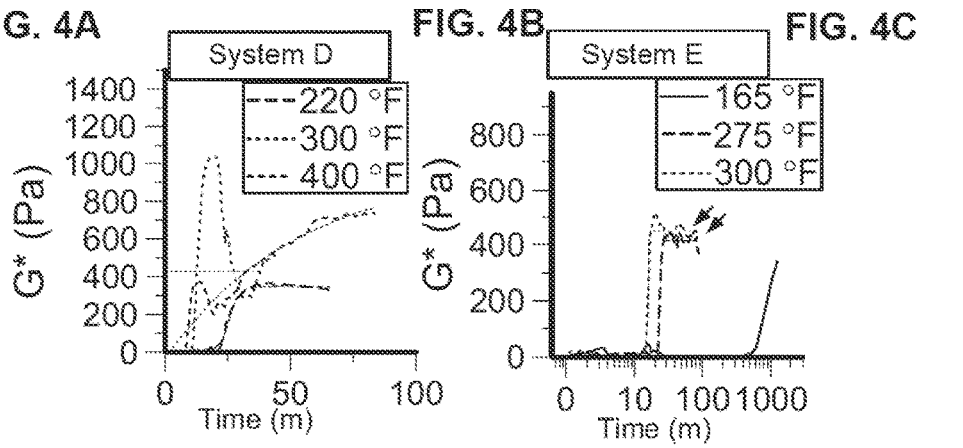

The shear modulus of the Systems A-E shown in Table 2 are graphed in FIG. 4 for comparison. Different mechanical properties were tested in order to predict resin reliability and resin failure. At temperatures up to 250° F., the samples cured continuously without any degradation. At higher temperatures (up to 400° F.), the graphs for the storage modulus became noisier. From this, the temperature limits for each of these systems was determined.

Figure 5A:
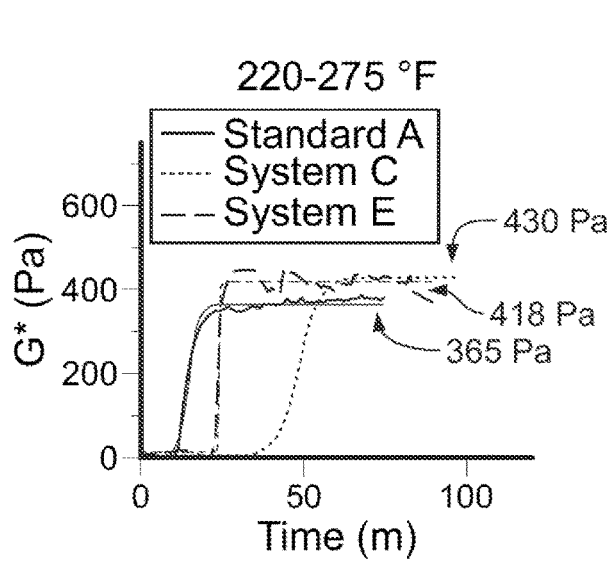
FIGS. 5A-5B show the shear modulus G* of Systems A, C, and E graphed at 1000 psi for comparison at temperatures: low (220-275° F.) and high (300-320° F.).
Figure 5B:
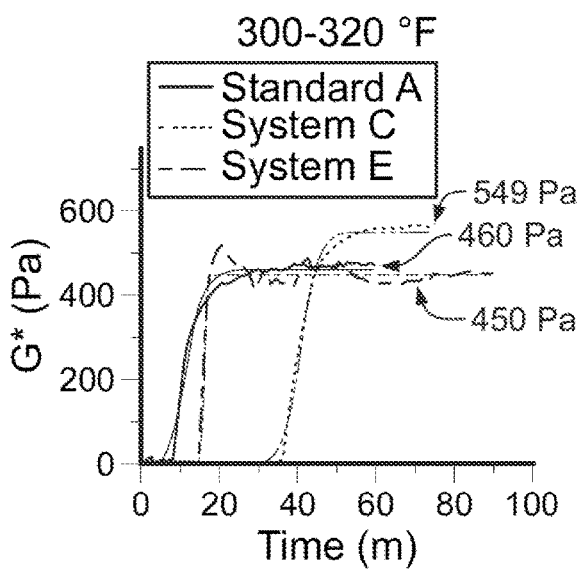

The two systems designed with and without the aromatic crosslinkers behaved differently at low and high temperatures. System A (without aromatic crosslinkers) was compared to Systems C and E (with aromatic crosslinkers). As shown in FIG. 5A, for a temperature range that was low (220-275° F.), System C had the most elasticity with a high $G^*$ value, with an 85% increase. Whereas at higher temperatures (300-320° F.), the resins had different shear moduli; System C had the most elasticity with a high $G^*$ value, with an 82% increase in comparison to System A (FIG. 5B). The results are shown in Table 6.

TABLE 6

Shear modulus $G^*$ of Systems A, C, E at 1000 psi

| | System A | System C | System E |
|---|---|---|---|
| 220-275° F. | 365 Pa | 430 Pa | 418 Pa |
| 300-320° F. | 460 Pa | 549 Pa | 450 Pa |

Different mechanical properties were tested to predict resin reliability. At temperatures up to 250° F., the samples cured continuously without any degradation. At higher temperatures (up to 400° F.), the resins were found to cure as well.

Macro-Rheological Measurements

Quantitative analyses in-situ over time of the compositions as they isothermally cured into viscoelastic material, or gel, provided viscosity and shear modulus measurements that were unique to this resin system. The system was unique in that the G' remained close to the baseline, along with G", until G' (blue line) increased and crossed over G", where G'>G" when the resin started to gel.

Figure 6:
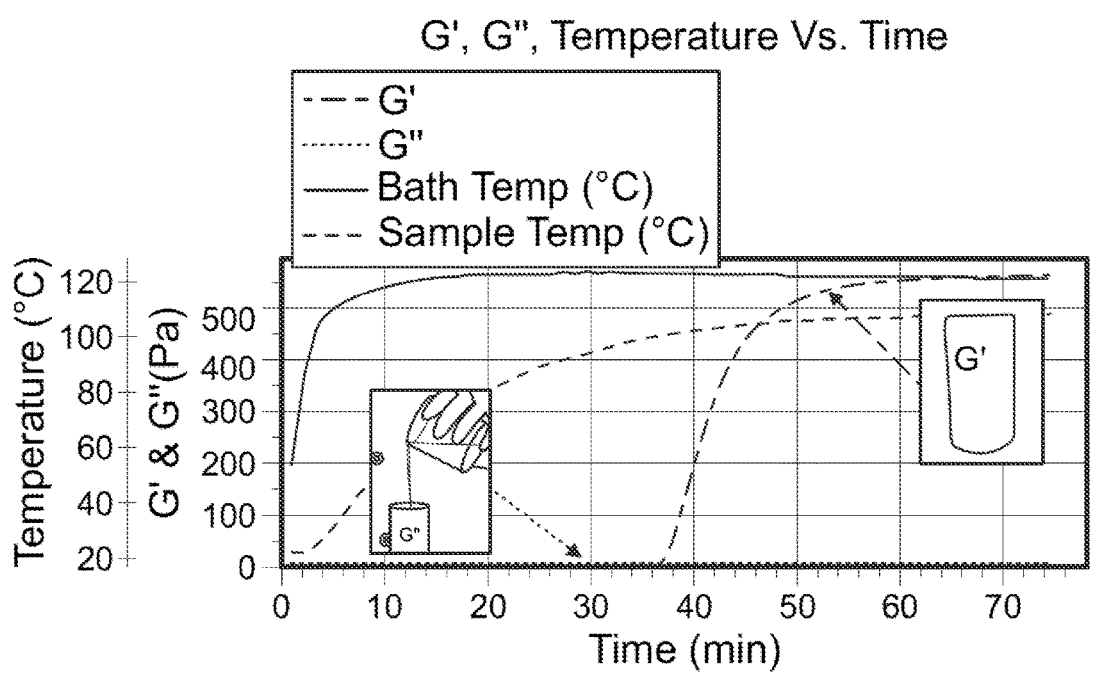
FIG. 6 is a representation of test parameters and shear moduli measurements over time of viscoelastic sealant resins by the M5600 Grace Rheometer, under confined conditions at 1000 psi. The temperature was set at 250° F. (121° C., brown line). In this sample, the actual temperature reached 226° F. (108° C., red line).

The rheometer in this study featured software to monitor the viscoelastic material over time under isothermal conditions. FIG. 6 is an example of a test that shows a targeted temperature of 250° F. (121° C.). But the sample T only reached 226° F. (108° C., red line). The intersection between G' (blue line) and G" (green line) is clearly shown, where the loss modulus, and G"→0 Pa. This large temperature difference between the bath and the sample temperature in FIG. 6 over the span of up to 90 minutes may result from the high heat capacity of a water-based polymer system.

The uniqueness in the shape of the rheological measurement for a resin that cured with temperature is seen in FIG. 6 (blue line and green line). This representative example (blue line) showed the characteristic phases of the resin at various temperatures as it cured.

After mixing, G">G', and the resin was water-thin and pumpable downhole. Viscosity was derived from this data.

The loss modulus (G") never increased over time as the temperature ramped up, even though G">G' before the gel cured (green line was flat).

As the resin cured into a solid gel (G'>G"), G' increased and became greater than G", where G" remained close to y→0.

Because of this behavior, $G^*$ was easily calculated from the data, where $G^*$=G'.

Here, the storage moduli (G') was the final value at the maximum for the overall shear modulus ($G^*$). This also provided values at the minimum and maximum of the curve, as well as the slope. The inflection point between the minimum and maximum value was the zero shear viscosity of the resin.

Example 2

Several resins were prepared (Formulas S1-S3) and cured under ambient pressure and at temperatures >200° F., resulting in resins with densities up to 1.4 g/cm$^3$. Table 7 shows compositions S1-S3 and applications for each of the systems.

TABLE 7

| Formula | Pressure | T (° F.) | Resin product | Application |
|---|---|---|---|---|
| S1 | ambient | 250 | Hard-set resin | Self-leveling |
| S2 | ambient | 300 | Hard-set adhesive | Bonds cement |
| S3 | 3000 | 300 | Silica-resin blend | Some elasticity |

Hard-Set Resin (S1)

Figure 7:
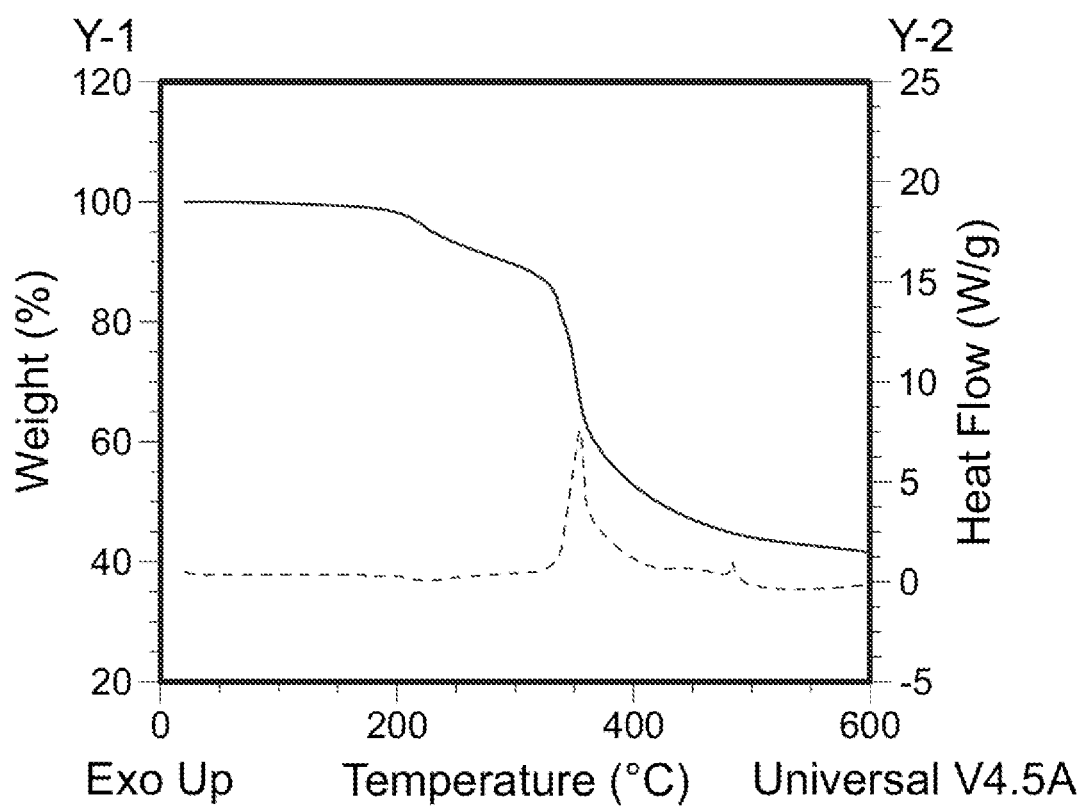
FIG. 7 shows data from a TGA (green line) and DSC (blue line) of a resin thermal response. Thermogravimetric (TGA) and differential scanning calorimetry (DSC) were performed of a non-elastic resin when thoroughly dehydrated into a hard-set, non-elastic resin. Dehydration occurs under unconfined conditions, at ambient pressure, while at temperature.

A resin system was allowed to cure under unconfined conditions (S1). The resin was dehydrated and water removed for a hard-set plastic resin without fractures or cracks. The resin was hard-set and film-forming, and produced little to no gas by-product for a smooth finished surface. Film-forming, the resin filled the bottom of the container without curling around the edges or shrinking away from the walls of the container. When cured at ambient pressure and at 250° F., the resin formed a solid smooth and hard-set material that was opaque in color. At ambient pressure, the polymer dehydrated and cured into a hard material after shrinking 90% into a material with 1.39 g/cm$^3$ density. The formulation is shown in Table 8. FIG. 7 shows data from a TGA (green line) and DSC (blue line) of resin thermal response. Thermogravimetric (TG) and differential scanning calorimetry (DSC) were performed with a TA Instrument Q600 series, and measurements were made at a heating rate of 10° C. min$^{-1}$ in nitrogen. The resin was shown to perform under high temperatures relevant to oil well conditions. An example of a thermogravimetric curve of this hard-set resin synthesized in-lab showed the first weigh loss at 196° C. which can be attributed to polyaramide and polymaleimide. The most significant weight loss was near 349° C. (660° F.) which indicates the onset decomposition temperature of the resin.

TABLE 8

Formulation S1 in water

| Reagent | (%) |
|---|---|
| Isobam 104 | 12 |
| Citric acid | 1.8 |
| TSP | 1.2 |
| SDS | 1.0 |
| APBZ | 1.0 |
| TMA | 0.3 |
| TEPA | 0.0 |
| EtOH | 0.2 |

Degradation temperature 200° C.
Density 1.39 g/cm$^3$
SDS = sodium lauryl sulfate;
EtOH = ethanol Adhesion by Resin (S2)

Under unconfined conditions (300° F. overnight, ~16 hours), the resin was allowed to cure and bonded two pieces of fractured cements. In comparison to set cement, the bonded cement had the compression strength shown in Table 8.

Briefly, after mixing the resin, the cement pieces were joined together using a generous amount of resin. The two halves were held in place using Teflon tape and placed into a container with resin placed in between the pieces and submerged in resin. After curing, the sample was removed from the container, and resin on the cement surface and Teflon tape were removed. Using a uniaxial loading cell, the samples were crushed until failure at ambient conditions. The resin helped to recover 87.2% of compression strength.

Temperature range: 180-300° F., where 180° F. and 220° F. made a soft-set, elastic resin with little bonding, and 300° F. made the hard-set resin (density 1.4 g/cm$^3$, cured) needed for bonding and for the high recovering of compression strength (Table 9).

TABLE 9

Formulation S2 in water

| Reagent | (%) |
|---|---|
| Isobam 104 | 20 |
| Citric acid | 3 |
| TSP | 2.3 |
| TEPA | 1.0 |
| APBZ | 0.2 |
| TMA | 0.1 |
| Compression Strength (CS) | |
| Neat cement | 4930 psi |
| Bonded cement | 4297 psi |
| Recovered CS | 87.2% |

Resin With filler (S3)

Weighing agents such as silica flour and barite, even Portland cements and other cementitious materials, can be used to increase the density of the resin in order to achieve rheological hierarchy. Subsequent to downhole repairs in order to recover the well, the resin displaces the formation fluid and is placed to seal the fractures. To maintain density hierarchy, the resin is designed with a higher density to displace all previous fluids in the hole. Maintaining effective laminar flow rules are critical to properly recover wells using this sealant resin. In one example, 21% (w/w) barite (BaSO$_4$) was added to the liquid resin for an increase in density by 14.77%, as required for a specific application.

This resin was successfully mixed with silica flour to form a uniform resin loaded with a solid. Briefly, to form the resin with filler:silica flour was mixed into the resin to increase structural rigidity and density. Samples contained: 85% resin and 15% silica flour; 60% resin and 40% silica (% w/w); 50% resin and 50% silica flour (1:1). The preferred solid content was a 1:2 ratio of silica to resin (more resin). Because the cement was water-based and highly alkaline, the resin was compatible with Portland cement and hydraulic systems. An exemplary formulation is shown on Table 10.

TABLE 10

Water-based formulation to make a resin system with silica flour as a filler.

| Reagent | (%) |
|---|---|
| Isobam 104 | 15 |
| Citric acid | 0.2 |
| TSP | 0.4 |
| TEPA | 1.0 |
| APBZ | 0.2 |
| TMA | 0.3 |

In another formulation, 0.02% citric acid, 2.4% acetone, 0.5% TEPA were used to successfully make a resin without deformation.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating a subterranean formation or cement construction comprising:

providing to the subterranean formation or cement construction a liquid resin composition comprising:

a poly-alkene maleic anhydride copolymer comprising:

repeat units I and II:

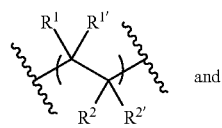 and

I

-continued

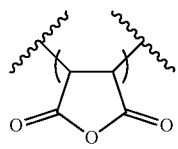
II wherein $R^1$, $R^{1'}$, $R^2$, and $R^{2'}$ are each independently selected from —H and —($C_1$-$C_5$)alkyl;
a polyethylene glycol (PEG) having a molecular weight of about 5000 Da to about 50,000 Da; and
a crosslinker comprising an ethyleneamine, a benzenetricarboxylic acid, and a benzimidazole;
wherein the liquid resin composition has a viscosity of about 2,000 mPa·s to about 7,500 mPa·s at 22° C.; and
crosslinking the composition to form a sealant.

2. The method of claim 1, wherein forming the sealant prevents or retards undesired loss or flow of wellbore fluid into the formation or construction; or the flow of formation fluids into the formation or construction.

3. The method of claim 1, wherein $R^1$, $R^{1'}$, $R^2$, and $R^{2'}$ are each independently selected from —H or —$CH_3$.

4. The method of claim 3, wherein one of $R^1$ and $R^{1'}$ is H and the other is —$CH_3$; and one of $R^2$ and $R^{2'}$ is H and the other is —$CH_3$.

5. The method of claim 3, wherein $R^1$ and $R^{1'}$ are each H and $R^2$ and $R^{2'}$ are each independently selected from —H or —$CH_3$.

6. The method of claim 1, wherein repeat unit I is selected from:

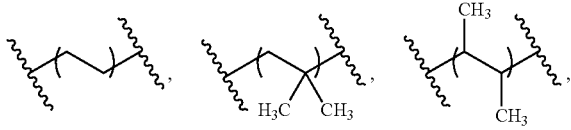

or combinations thereof.

7. The method of claim 6, wherein repeat unit I is

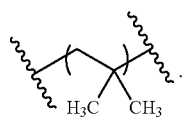

8. The method of claim 6, wherein repeat unit I is

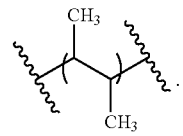

9. The method of claim 1, wherein repeat units I and II alternate in the maleic anhydride copolymer.

10. The method of claim 1, wherein the polyethylene glycol has a molecular weight of about 20,000 Da.

11. The method of claim 1, wherein the composition comprises about 20 wt % to about 40 wt % of the polyalkene maleic anhydride copolymer and PEG.

12. The method of claim 1, wherein the ethyleneamine is selected from ethylenediamine (EDA), diethylenetriamine (DETA), aminoethylpiperazine (AEP), triethylenetetraamine (linear-TETA), tris(2-aminoethyl)amine (branched-TETA), N,N'-bis-(2-aminoethyl)piperazine(bis-AEP), N-[(2-aminoethyl) 2-aminoethyl]piperazine), piperazinoethylethylenediamine (PEEDA), tetraethylenepentamine (TEPA), or mixtures thereof.

13. The method of claim 1, wherein the ethyleneamine is TEPA.

14. The method of claim 1, wherein the benzenetricarboxylic acid is selected from 1,2,3-benzenetricarboxylic acid (hemimellitic acid), 1,2,4-benzenetricarboxylic acid (trimellitic acid), 1,3,5-benzenetricarboxylic acid (trimesic acid), or mixtures thereof.

15. The method of claim 1, wherein the benzenetricarboxylic acid is trimesic acid.

16. The method of claim 1, wherein the benzimidazole is a substituted phenylbenzimidazole.

17. The method of claim 1, wherein the benzimidazole is 5-amino-2-(4-aminophenyl)benzimidazole (APBZ).

18. The method of claim 1, wherein the crosslinker comprises TEPA, trimesic acid, and APBZ.

19. The method of claim 1, wherein the pH of the composition is between about 12 to about 15.

20. The method of claim 1, wherein the composition comprises an aqueous carrier.

21. The method of claim 1, wherein the composition has a density greater than about 1.10 g/cm³ and an elasticity of greater than about 2000 N/m.

* * * * *

UNITED STATES PATENT AND TRADEMARK OFFICE
CERTIFICATE OF CORRECTION

PATENT NO. : 12,378,463 B2
APPLICATION NO. : 18/468163
DATED : August 5, 2025
INVENTOR(S) : Elizabeth Contreras It is certified that error appears in the above-identified patent and that said Letters Patent is hereby corrected as shown below:

On the Title Page

Column 2 (item (57) abstract), Line 7, delete " " and insert -- 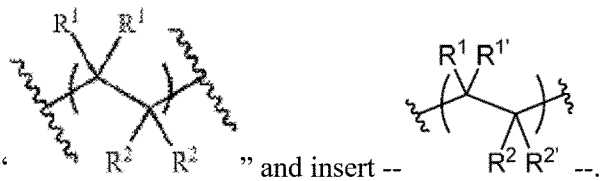 --.

In the Claims

In Column 30, Lines 20-21, Claim 12, replace "triethylenetetraamine" with -- triethylenetetramine --.

In Column 30, Line 22, Claim 12, replace "piperazine(bis-AEP)," with -- piperazine (bis-AEP), --.

In Column 30, Line 23, Claim 12, replace "aminoethyl) 2-" with -- aminoethyl)2- --.

In Column 30, Line 23, Claim 12, replace "piperazine)," with -- piperazine, --.

Signed and Sealed this
Thirteenth Day of January, 2026

John A. Squires
*Director of the United States Patent and Trademark Office*